(12) United States Patent
Chan

(10) Patent No.: US 8,337,378 B2
(45) Date of Patent: Dec. 25, 2012

(54) CONTINUOUS SELF-CLEANING CENTRIFUGE ASSEMBLY HAVING TURBIDITY-SENSING FEATURE

(75) Inventor: Chris Kwok On Chan, Burwood East (AU)

(73) Assignee: GEA Westfalia Separator GmbH, Oelde (DE)

( * ) Notice: Subject to any disclaimer, the term of this patent is extended or adjusted under 35 U.S.C. 154(b) by 357 days.

(21) Appl. No.: 12/514,968

(22) PCT Filed: Nov. 15, 2007

(86) PCT No.: PCT/AU2007/001760
§ 371 (c)(1),
(2), (4) Date: May 14, 2009

(87) PCT Pub. No.: WO2008/058340
PCT Pub. Date: May 22, 2008

(65) Prior Publication Data
US 2010/0081552 A1 Apr. 1, 2010

(30) Foreign Application Priority Data
Nov. 15, 2006 (AU) .................................. 2006906386

(51) Int. Cl.
*B04B 1/14* (2006.01)
*B04B 11/04* (2006.01)
*B04B 13/00* (2006.01)
(52) U.S. Cl. .................. 494/2; 494/10; 494/35; 494/37; 494/42; 494/70
(58) Field of Classification Search .................. 494/1–6, 494/10–11, 35, 37, 42, 68–73
See application file for complete search history.

(56) References Cited

U.S. PATENT DOCUMENTS

| 3,734,398 A | | 5/1973 | Keith, Jr. et al. |
| 4,083,488 A | * | 4/1978 | Gunnewig ...................... 494/27 |
| 4,149,668 A | * | 4/1979 | Zurbruggen ...................... 494/2 |
| 4,151,950 A | * | 5/1979 | Gunnewig ........................ 494/2 |
| 4,305,817 A | * | 12/1981 | Kohlstette ...................... 210/104 |
| 4,475,897 A | * | 10/1984 | Bradtmoller .................... 494/35 |
| 4,525,155 A | * | 6/1985 | Nilsson ............................ 494/3 |
| 4,536,285 A | | 8/1985 | Karlsson |
| 4,729,759 A | | 3/1988 | Krook et al. |
| 4,755,165 A | * | 7/1988 | Gunnewig ...................... 494/37 |
| 4,805,659 A | | 2/1989 | Gunnewig et al. |

(Continued)

FOREIGN PATENT DOCUMENTS
EP 0 891 814 1/1999
(Continued)

*Primary Examiner* — Charles E Cooley
(74) *Attorney, Agent, or Firm* — Barnes & Thornburg LLP

(57) ABSTRACT

A continuous self-cleaning centrifuge assembly having a feed inlet for unclarified liquid and first and second outlets for clarified liquid. Solids are discharged out of a solids holding space in the centrifuge in response to comparison of a measured turbidity to a predetermined turbidity parameter of clarified liquid bled in a detection line in communication with the centrifuge at the second outlet. The turbidity is affected by the degree of build up of solids in the centrifuge. A method of optimizing the clarified liquid outflowing from the centrifuge includes the steps of controlling the flow rate of unclarified liquid into the centrifuge in response to the turbidity of the clarified liquid flowing out of the centrifuge and discharging solids out of a solids holding space in the centrifuge in response to the turbidity measurement.

20 Claims, 3 Drawing Sheets

U.S. PATENT DOCUMENTS

| | | | |
|---|---|---|---|
| 4,820,256 A * | 4/1989 | Nordstrom | 494/3 |
| 4,840,612 A * | 6/1989 | Pallmar | 494/2 |
| 5,199,938 A * | 4/1993 | Kohlstette et al. | 494/10 |
| 5,300,014 A | 4/1994 | Chin et al. | |
| 5,453,832 A | 9/1995 | Joyce | |
| 5,800,330 A * | 9/1998 | Modeer | 494/2 |
| 6,358,193 B1 * | 3/2002 | Nyberg | 494/2 |
| 6,368,264 B1 | 4/2002 | Phillips et al. | |
| 6,468,574 B1 | 10/2002 | Zettier | |
| 7,485,084 B2 * | 2/2009 | Borgstrom et al. | 494/2 |
| 7,678,039 B2 * | 3/2010 | Åstrom | 494/37 |
| 2009/0298666 A1 * | 12/2009 | Trager et al. | 494/10 |
| 2010/0081552 A1 * | 4/2010 | Chan | 494/3 |
| 2010/0184579 A1 * | 7/2010 | Trager | 494/56 |

FOREIGN PATENT DOCUMENTS

| | | |
|---|---|---|
| JP | 60-54753 | 3/1985 |
| JP | 10-118530 | 5/1998 |
| RU | 2004 105 041 | 2/2005 |
| SU | 1225820 | 4/1986 |
| WO | WO 2008058340 A1 * | 5/2008 |

* cited by examiner

CONTINUOUS SELF-CLEANING CENTRIFUGE ASSEMBLY HAVING TURBIDITY-SENSING FEATURE

FIELD OF THE INVENTION

The present invention relates to a method of optimising the clarified phase outflowing from a continuous self-cleaning centrifuge and also to a continuous self-cleaning centrifuge assembly.

BACKGROUND OF THE INVENTION

A centrifugal separator is used for separating solids suspended in a liquid to create a clarified phase. One type of centrifugal separator is known as a continuous self-cleaning centrifuge. In this type, solids suspended in a liquid are fed into the inlet line, the solids build up at the outer central perimeter of the centrifuge's double cone bowl and are automatically periodically discharged in response to either a threshold upper turbidity reading of the clarified phase in the outflow line or a loss of flow in a detection line running from the solids holding space to the inlet line. The solids build up in the holding space and up into the detection line where a loss of flow detector is activated.

For optimum results, an operator must regularly adjust the flow rate in and the flow rate out to achieve the required clarity in the clarified phase. In practice, these machines are operated well below optimum because of a conservative approach to avoid a block-up condition, which requires the machine to be dismantled and be off-line for at least a day. Some plants, e.g. wineries, use a single centrifuge for several, up to eight, separate operations in a process. Having a centrifuge off-line for a day can create significant delays in production times. Operating below optimum means, primarily, that too much valuable fluid is lost in the solids or that the quality of the clarified phase is inadequate.

It is therefore an object of the present invention to provide a method and assembly for optimising the clarified phase outflowing from a continuous self-cleaning centrifuge. In one embodiment of the invention, it is an object to optimise the clarified phase in regards to both the quality and quantity with respect to the liquid fed into the inflow line.

SUMMARY OF THE INVENTION

According to a first aspect, the present invention provides a continuous self-cleaning centrifuge assembly, having a feed inlet to the centrifuge for unclarified liquid and an outlet for clarified liquid, further including means to discharge solids out of a solids holding space in the centrifuge in response to a monitored turbidity parameter of liquid in a detection line in communication with the centrifuge separately from said outlet so that said turbidity is affected by the degree of build up of solids in the centrifuge.

Preferably a detection line communicates to a feed line for unclarified liquid connected to said feed inlet whereby the small proportion of liquid bled to the detection line is fed back or recycled to the feed line upstream of said feed inlet. There may be provided means to monitor the turbidity of the liquid and solids in the detection line. Preferably, the means to discharge solids out of the holding space includes gate means, and a controller to activate the gate means in respect to a predetermined variation in a turbidity parameter monitored at the turbidity monitoring means. The means to discharge is preferably a sliding piston that opens a path to allow the flow of solids out of the holding space. The controller may be a central computer.

Advantageously, when the means for monitoring the turbidity of the solids in the detection line measures turbidity greater than predetermined value, the means to discharge is activated to discharge solids out of the solids holding space in the bowl.

There may be provided means to control the flow rate of liquid into the centrifuge in response to the turbidity of the clarified phase flowing out of the centrifuge.

According to a second aspect, the present invention provides a continuous self-cleaning centrifuge assembly having a feed inlet to the centrifuge for unclarified liquid and an outlet for clarified liquid, further including means to control the flow rate of liquid into the centrifuge at said feed inlet in response to a measure of turbidity of the clarified phase flowing out of said outlet, and including means to discharge solids out of a solids holding space in the centrifuge in response to a monitored turbidity parameter of liquid in a detection line in communication with the centrifuge separately from said outlet so that said turbidity is affected by the degree of build up of solids in the centrifuge.

Additionally, according to the first or second aspect there may further be provided means to monitor the flow rate of the liquid and solids in the detection line. When the means for monitoring the flow rate measures a flow rate less than a predetermined value, the means to discharge is activated to discharge solids out of the solids holding space.

The assembly may include a feed line for flow of liquid into the bowl and means to control the flow rate in the feed line. Preferably, an outlet line for flow of clarified phase out of the bowl and means for monitoring the turbidity of the clarified phase in the outlet line is provided. When the means for monitoring the turbidity of the clarified phase in the outlet line measures turbidity greater than a first predetermined value or less than a second predetermined value, the means to control flow in the feed line decreases or increases the flow rate of liquid accordingly.

Preferably, the means to control flow rate in the feed line is a positive displacement pump controlled by a frequency inverter. The means to monitor the turbidity is a turbidity sensor. The turbidity predetermined values, which can be entered manually by the operator prior to operation, are determined depending on the type of properties required in the clarified phase. The means for monitoring the flow rate is preferably a flowmeter.

According to a third aspect, the present invention provides a method of optimising the clarified phase outflowing from a continuous self-cleaning centrifuge having a feed inlet to the centrifuge for unclarified liquid and an outlet for clarified liquid, wherein solids are discharged out of a solids holding space in the centrifuge in response to a turbidity parameter measurement of liquid in a detection line in communication with the centrifuge separately from said outlet so that said turbidity is affected by the degree of build up of solids in the centrifuge.

Preferably, when the turbidity of the solids in the detection line is measured greater than a predetermined value the solids are discharged from the solids holding space.

According to a fourth aspect, the present invention provides a method of optimising the clarified phase outflowing from a continuous self-cleaning centrifuge having a feed inlet to the centrifuge for unclarified liquid and an outlet for clarified liquid, wherein the flow rate of unclarified liquid into the centrifuge is controlled in response to the turbidity of the clarified phase flowing out of the centrifuge, and wherein solids are discharged out of a solids holding space in the centrifuge in response to a turbidity parameter measurement of liquid in a detection line in communication with the centrifuge separately from said outlet so that said turbidity is affected by the degree of build up of solids in the centrifuge.

Advantageously, when the turbidity of the clarified phase is measured as being greater than a first predetermined value, the flow rate of liquid in the feed line is decreased, and, when the turbidity of the clarified phase is measured lower than second predetermined value, the flow rate of liquid in the feed line is increased.

Advantageously, the flow rate of the clarified phase in the outflow line is monitored. A back pressure set point for controlling the clarified phase back pressure may be set automatically according to a measured flow rate.

In a fifth aspect of the invention, there is provided a continuous self-cleaning centrifuge assembly having a feed inlet to the centrifuge for unclarified liquid and an outlet for clarified liquid, further including means to discharge solids out of a solids holding space in the centrifuge in response to a monitored turbidity parameter of liquid in an outflow line connected to said outlet, wherein said turbidity parameter is the rate of rate of turbidity increase, or second derivative, of the monitored turbidity.

The invention also provides, in its fifth aspect, a method of optimising the clarified phase outflowing from a continuous self-cleaning centrifuge having a feed inlet to the centrifuge for unclarified liquid and an outlet for clarified liquid, wherein solids are discharged out of a solids holding space in the centrifuge in response to a turbidity parameter measurement of liquid in an outflow line connected to said outlet, wherein said turbidity parameter is the rate of rate of turbidity increase, or second derivative, of the monitored turbidity.

BRIEF DESCRIPTION OF THE DRAWINGS

The invention will now be described, by way of example only, with reference to the accompanying drawings, in which.

DETAILED DESCRIPTION OF THE EMBODIMENTS

Figure 1:
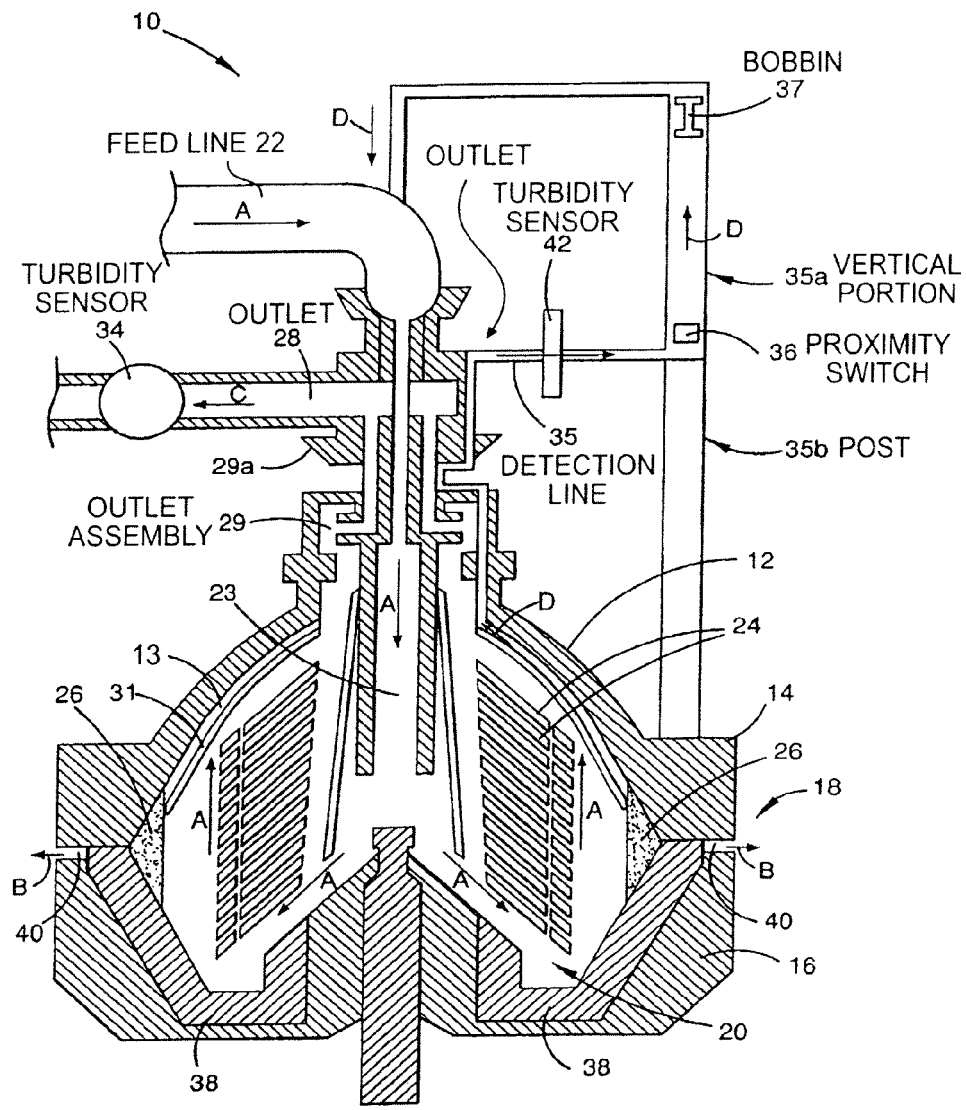
FIG. 1 is a cross-sectional view of a continuous self-cleaning centrifuge according to an embodiment of several aspects of the present invention.
Figure 2:
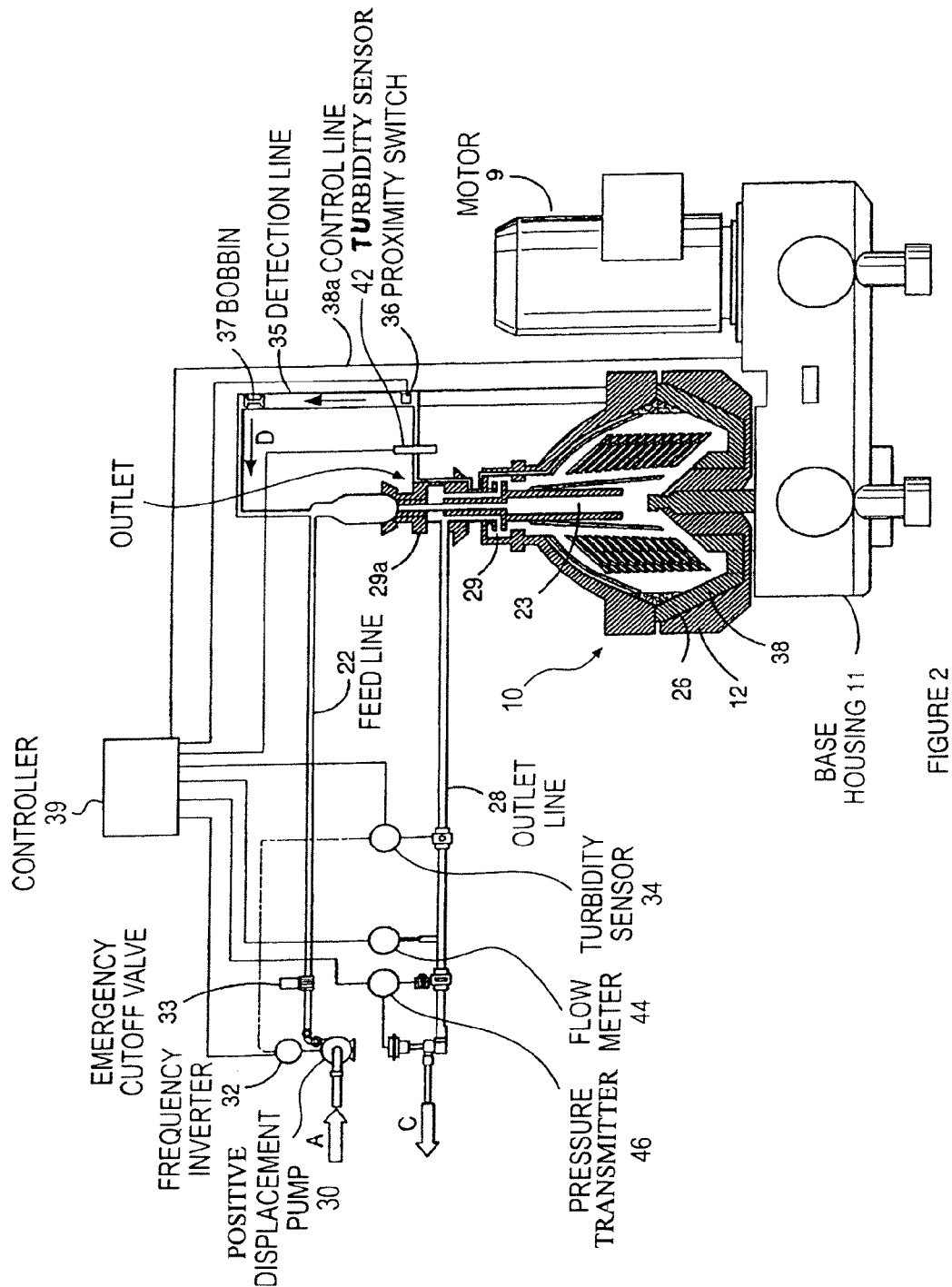
FIG. 2 is a diagrammatic representation of the centrifuge of FIG. 1, with associated flow lines and control circuits.

As can be seen from FIG. 1, a continuous self-cleaning centrifuge 10 includes a centrifuge bowl 12 formed from two parts 14, 16, which are held together at a central perimeter 18. Inside is a centrifuge chamber 20. Unclarified liquid is fed into the chamber 20 via a feed line 22 to a central feed inlet 23, the direction being shown by arrows A. As shown in FIG. 2, centrifuge 10 is supported in a known arrangement on a base housing 11 via which the bowl 12 is rotated at high speed by an adjacent motor 9.

The chamber 20 includes a plurality of conical discs 24. During operation, as the bowl 12 rotates, the solids are spun out by centrifugal force to a solids holding space 26 at the perimeter of the bowl 12. The solids in the holding space 26 are periodically discharged from the bowl 12. Discharge is achieved by the release of a gate including a sliding piston 38, which is activated by a signal via control line 38a from a main controller 39 to open up a gap 40 for discharging the solids out of the bowl 12 in the direction of arrows B (shown in FIG. 1).

The clarified phase flows out of the chamber 20 through the conical discs 24 towards the centre of the rotating centrifuge 10 and discharges via an outlet assembly 29 and stationary head 29a to an outlet 28, the direction being shown by arrows C.

As can be seen in more detail from FIG. 2, the feed line 22 and outlet line 28 are monitored and controlled. The flow rate of the liquid in the feed line 22 is controlled by a positive displacement pump 30 or by other alternative method like a modulating valve. The pump 30 is controlled by a frequency inverter 32. An emergency cut-off valve 33 is also provided on the feed line 22.

As shown in the drawings, there is provided a means for monitoring the turbidity of the clarified phase in the form of turbidity sensor 34 on outlet line 28. A turbidity set point band of the clarified phase is input at an operating panel by an operator. When the measured turbidity is lower than the set point band, a signal is sent by controller 39 to the frequency inverter 32, which speeds up the pump 30 until the turbidity in outlet line 28 is within a set point band. When the measured turbidity is higher than the set point band, a signal is similarly sent to the frequency inverter 32, which decreases the speed of the pump 30 until the turbidity is within the set point band. Increasing the flow rate reduces the retention time of the liquid under centrifugal force, which means more solids particles are carried with the liquid flow into the clarified phase, measuring a higher turbidity reading. By decreasing the flow rate, the retention time is increased. More fine particles get carried under centrifugal force to the solids holding space 26, resulting in a lower turbidity of the clarified phase.

A small stream of the liquid is bled from the bowl 12 into a thin conical gap 13 defined by a separating disc 31. Gap 13 is thereby at the periphery of the bowl and communicates at its outer end with solids holding space 26. Detection line 35 opens for conical gap 13 and communicates back to the feed line 22. The small proportion of liquid bled to line 35 is thereby fed back or recycled into feed line 22 upstream of inlet 23. The flow is shown by arrows D in FIG. 1. As the separated solids collect and increase in volume in the solids holding space 26 more and more finer particles escape into the detection line 35 and show up as a increase in turbidity. Hence the turbidity of liquid in line 35 is affected by the degree of build up of solids in bowl 12. Means in the form of a turbidity sensor 42 is provided to monitor the turbidity in the detection line 35. If the turbidity or another turbidity-related parameter is greater than a predetermined value or outside a predetermined range, a signal is sent via controller 39 to activate the sliding piston 38 to discharge the solids held in the holding space 26. No operator input is required to monitor the discharge.

In a conventional approach, turbidity itself is monitored and the controller 39 automatically sets the turbidity value as a set percentage of the stable turbidity value. Alternatively, in accordance with the fifth aspect of the invention, the turbidity is monitored but the controlling parameter is the rate of rate of turbidity increase, or the second derivative, of the turbidity T with respect to time t, $$\frac{d^2 T}{dt^2}.$$

It has been observed that the turbidity tends to increase steadily (i.e.

is constant) and then sharply increase at an observable breakaway point so that there is a change to a positive value in the second derivative $$\frac{d^2T}{dt^2}.$$

Additionally, when certain heavy compactable solids fill up the holding space 26, the turbidity in the detection line 35 may not necessarily increase, or reach the trigger condition for discharging the solids, however the liquid flowing through the detection line 35 may be interrupted by these heavy solids as the conical gap 13 is blocked. A bobbin 37 is located in a vertical portion 35a atop a post 35b of the detection line 35, and is normally held in an elevated position (illustrated in FIG. 1) by the upward flow of liquid. If the flow is interrupted by heavy solids the detection line 35 empties and the bobbin 37 will fall and be detected by a proximity switch 36 whose state is monitored by controller 39. This will trigger a signal to be sent by the controller to the sliding piston 38 to discharge the solids held in the holding space 26. Again, no operator input is required to monitor the discharge.

The aforementioned technique of determining the second derivative of the measured turbidity with respect to time may also be optionally employed at turbidity sensor 34 on outlet line 28, for controlling pump 30 and therefore the flow rate in feed line 22. One or more suitable responses to detection of a change to a positive value or other feature of the determined rate of rate of turbidity increase, i.e. the $$\frac{d^2T}{dt^2}$$

function, would be programmed into computer 39.

Figure 3:
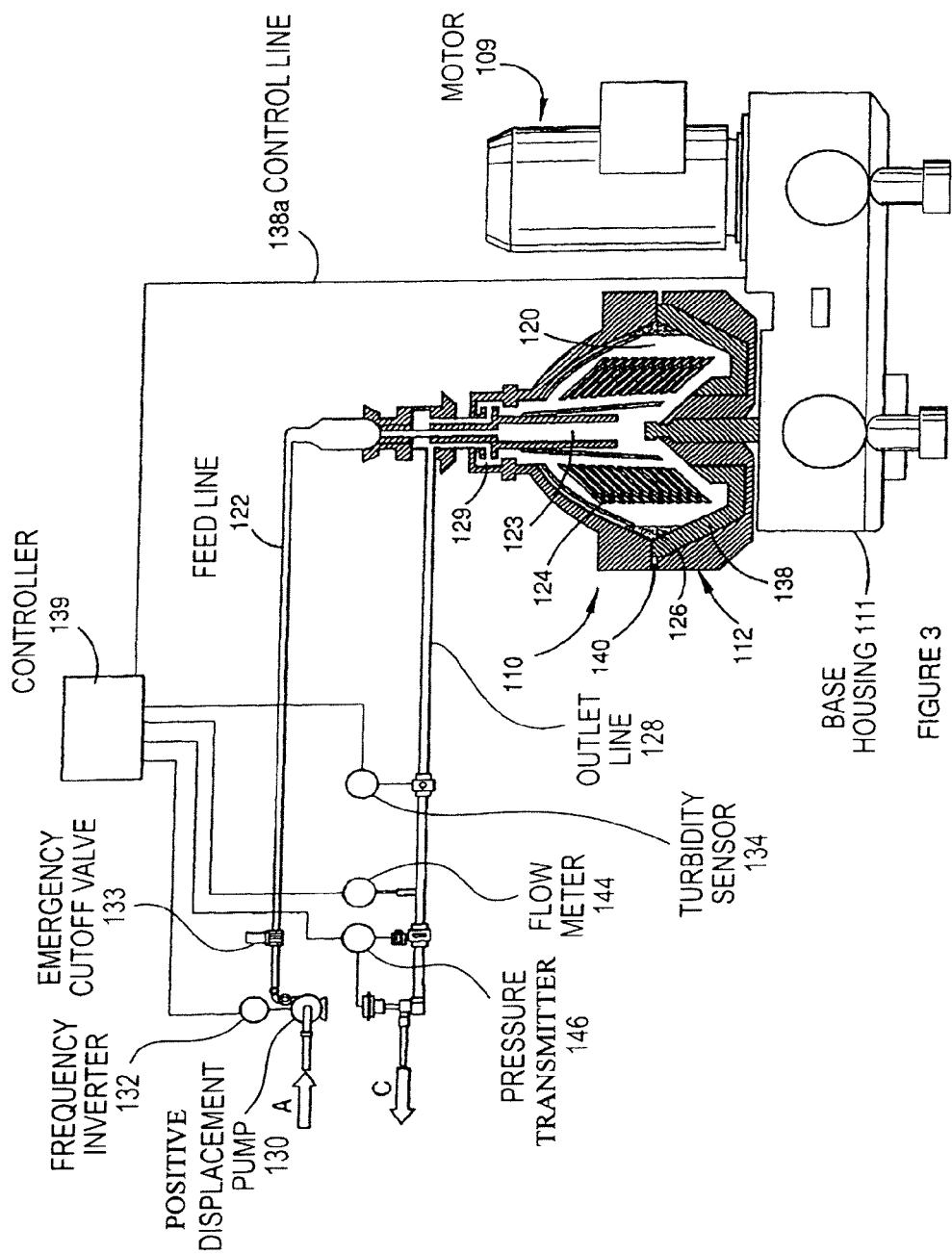
FIG. 3 is a view similar to FIG. 2 of an embodiment of the fifth aspect of the invention.

In a still further alternative embodiment of the fifth aspect of the invention, discharge of solids from holding space 26 may be triggered in response to determination of $$\frac{d^2T}{dt^2}$$

at turbidity sensor 34, either as a control loop additional to those already described, or in an otherwise conventional centrifuge assembly not embodying the first to fourth aspects of the invention. This latter embodiment is depicted diagrammatically in FIG. 3, in which like parts are indicated by the same reference numerals preceded by 1. Again, one or more suitable responses to detection of a change to a positive value or other feature of the determined rate of rate of turbidity increase, i.e. the $$\frac{d^2T}{dt^2}$$

function, would be programmed into a controller 139 of the assembly.

In current systems, if release of the solids holding space is triggered too early, any liquid in the solids holding space would also be discharged. By waiting too long to discharge, the system can become blocked as the solids have been compressed by the centrifugal force such that they cannot be ejected through the gap 40. According to the present invention, by ensuring that the solids holding space 26 is accurately monitored and the discharge of solids is controlled, the discharged solids concentration is maintained at a high level with minimum liquid discharged (and therefore lost) with the solids.

A magnetic flowmeter 44 is installed in the clarified phase outlet line 28 to measure the flow rate of the clarified phase. A pressure transmitter 46 is provided and the back pressure set point for controlling the clarified phase discharge back pressure is set according to the measured flow rate. The operator is provided with a flow rate versus back pressure set points table to ensure the system is being controlled at optimum rate.

The main advantage of the present invention is that it optimises the clarified phase by monitoring and controlling the discharge of the solids built up. The detection line allows for both heavy and light solids to be accurately monitored. Additionally, the excess liquid lost in the solids output is greatly reduced and the operator is required to check the system less frequently, reducing labour costs. The combination of the first to fourth features allows the continuous self-cleaning centrifuge assembly to operate at optimum efficiency, without increasing the incidence of block-up of the system.

The centrifuge is fed with highest capacity while maintaining the required turbidity of the clarified product. This is all done totally automatically thus offering maximum yield and lower operational costs (less labour etc).

I claim:

1. A continuous self-cleaning centrifuge assembly, having:
   a feed inlet to the centrifuge for unclarified liquid;
   an outlet line for clarified liquid to flow out of the centrifuge;
   means for discharging solids out of a solids holding space in the centrifuge
   a detection line having an opening, the detection line being separate from the outlet line for clarified liquid and leading from the solids holding space to the feed inlet thereby creating a continuously open loop configured to bleed a small proportion of unclarified liquid from the solids holding space to the feed inlet;
   a first sensor in the outlet line for the clarified liquid;
   a second sensor in the detection line for the unclarified liquid;
   wherein the first sensor monitors the turbidity of the clarified liquid in the outlet line and including means for controlling the flow rate of the unclarified liquid into the centrifuge in response to said turbidity; and,
   wherein the unclarified liquid bleeds into the detection line and the second sensor measures the turbidity of the bled unclarified liquid, and in response to a comparison of the measured turbidity to a predetermined turbidity parameter, solids are caused to be discharged out of the solids holding space such that the discharging of the solids out of the solids holding space is in response to the measured turbidity that is affected by the degree of build up of solids in the centrifuge.

2. The continuous self-cleaning centrifuge assembly according to claim 1, wherein the assembly includes a centrifuge bowl including the solids holding space.

3. The continuous self-cleaning centrifuge assembly according to claim 2, wherein the detection line communicates to a feed line for unclarified liquid connected to said feed inlet whereby liquid bled to the detection line is fed back to the feed line upstream of said feed inlet.

4. The continuous self-cleaning centrifuge assembly according to claim 1, wherein said means for controlling the flow rate of the unclarified liquid into the centrifuge controls the flow rate in the feed inlet.

5. The continuous self-cleaning centrifuge assembly according to claim 4, wherein the means for controlling the flow rate in the feed inlet is a positive displacement pump or a modulating valve.

6. The continuous self-cleaning centrifuge assembly according to claim 4, wherein the means for controlling the flow rate in the feed inlet is controlled by a frequency inverter.

7. The continuous self-cleaning centrifuge assembly according to claim 2, wherein said detection line opens from a conical gap at the periphery of said centrifuge bowl, which gap communicates at its outer end with said solids holding space.

8. The continuous self-cleaning centrifuge assembly according to claim 1, wherein said means for discharging solids out of the solids holding includes gate means, and a controller to activate the gate means in response to the predetermined variation in the turbidity parameter monitored by the second sensor for monitoring the turbidity.

9. The continuous self-cleaning centrifuge assembly according to claim 1, wherein said turbidity parameter is the rate of rate of turbidity increase, or second derivative, of the measured turbidity of the liquid in the detection line.

10. The continuous self-cleaning centrifuge assembly according to claim 1, wherein , when the first sensor monitoring the turbidity of the clarified liquid in the outlet line measures turbidity greater than a first predetermined value or less than a second predetermined value, the means to control flow in the feed line decreases or increases the flow rate of liquid.

11. The continuous self-cleaning centrifuge assembly according to claim 1, further including means for monitoring the flow rate of the liquid and solids in the detection line.

12. The continuous self-cleaning centrifuge assembly according to claim 11, wherein, when the means for monitoring the flow rate of liquid in the detection line measures a flow rate less than a predetermined value, the means for discharging is activated to discharge solids out of the solids holding space in the bowl.

13. A method of optimising the clarified phase outflowing from a continuous self-cleaning centrifuge having a feed inlet to the centrifuge for unclarified liquid and an outlet line for clarified liquid, a first sensor in the outlet line and a second sensor in a detection line, wherein the detection line has an opening separate from the outlet line for the clarified liquid, the opening leading from the solids holding space to the feed inlet creating a continuously open loop to bleed a small proportion of unclarified liquid from the solids holding space back to the feed inlet, the method including the steps of controlling the flow rate of the unclarified liquid into the centrifuge in response to a turbidity measured by the first sensor measuring the clarified liquid in the outlet line, and discharging solids out of the solids holding space in the centrifuge in response to a turbidity measured by the second sensor measuring liquid bled into the detection line, such that the turbidity measured in the detection line is affected by the degree of build up of solids in the centrifuge.

14. The method according to claim 13, wherein when the turbidity of the solids in the detection line measures greater than a predetermined value, the solids are discharged from the solids holding space.

15. The method according to claim 13, further including the step of monitoring the flow rate of the liquid and solids in the detection line.

16. The method according to claim 15, wherein when the means for monitoring the flow rate measures a flow rate less than a predetermined value, a means for discharging solids is activated to discharge solids out of the solids holding space.

17. The method according to claim 13, wherein a back pressure set point for controlling a clarified liquid back pressure is set automatically according to a measured flow rate.

18. A continuous self-cleaning centrifuge assembly having a feed inlet to the centrifuge for unclarified liquid and an outlet for clarified liquid, further including means for discharging solids out of a solids holding space in the centrifuge and including control means for monitoring a turbidity parameter of liquid in an outflow line connected to said outlet, wherein said monitored turbidity parameter is the rate of rate of increase, or second derivative, of the turbidity of the liquid in said outflow line.

19. The continuous self-cleaning centrifuge assembly according to claim 18, wherein said means for discharging solids out of the solids holding space includes gate means, and a controller to activate the gate means in response to a predetermined variation in the monitored turbidity parameter means.

20. A method of optimising the clarified phase outflowing from a continuous self- cleaning centrifuge having a feed inlet to the centrifuge for unclarified liquid and an outlet for clarified liquid, the method including discharging solids out of a solids holding space in the centrifuge in response to a turbidity parameter measurement of liquid in an outflow line connected to said outlet, wherein said turbidity parameter is the rate of rate of increase, or second derivative, of the turbidity of the liquid in said outflow line.

* * * * *